Sept. 22, 1953     E. G. SCHMIDT ET AL     2,652,851
PILOT VALVE AND INDICATOR CONSTRUCTION
Filed Aug. 10, 1950     2 Sheets-Sheet 1
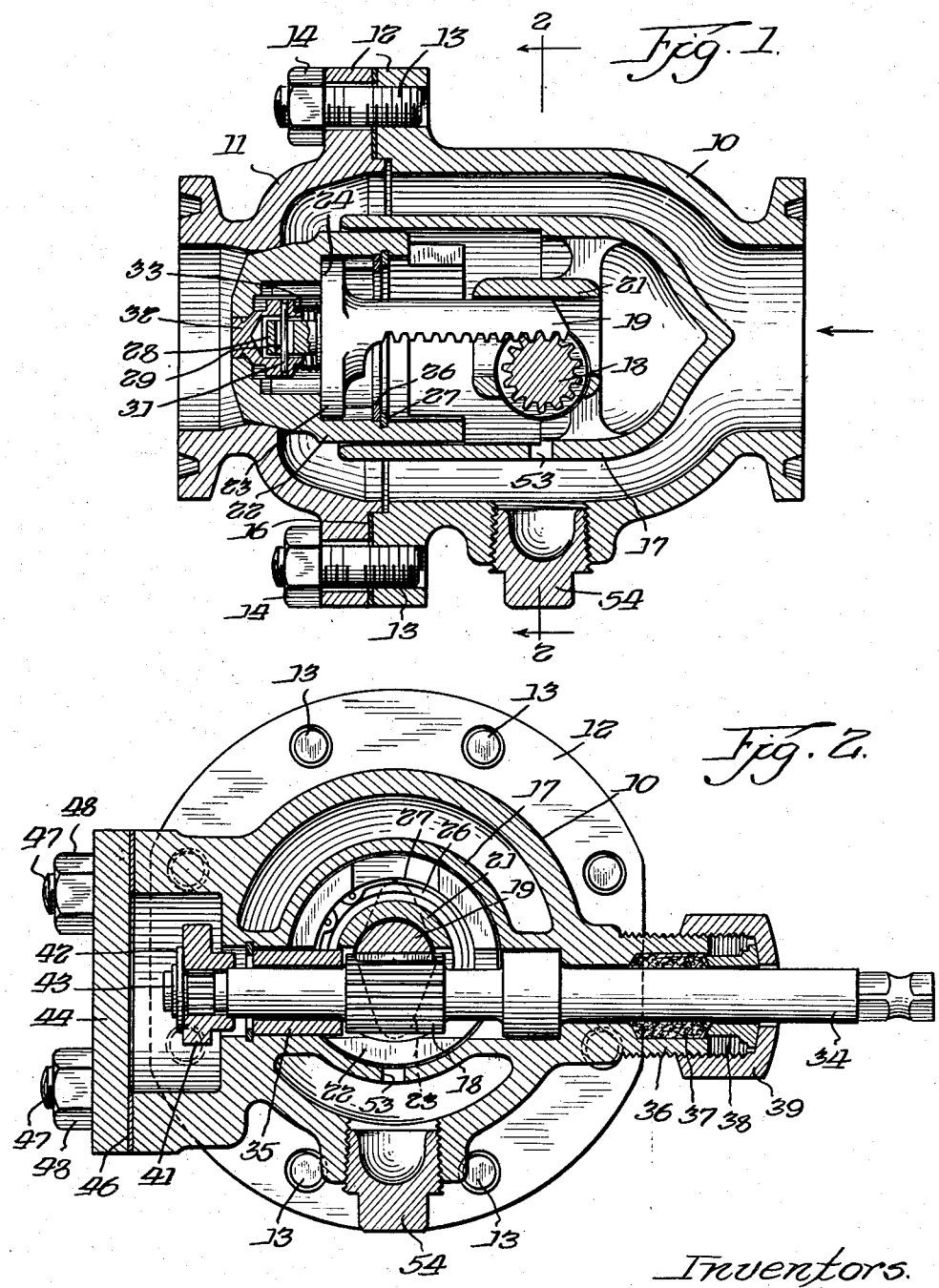
Inventors.
Edward G. Schmidt, &
John E. Svabek, Jr.
By Joseph O. Langran Atty.

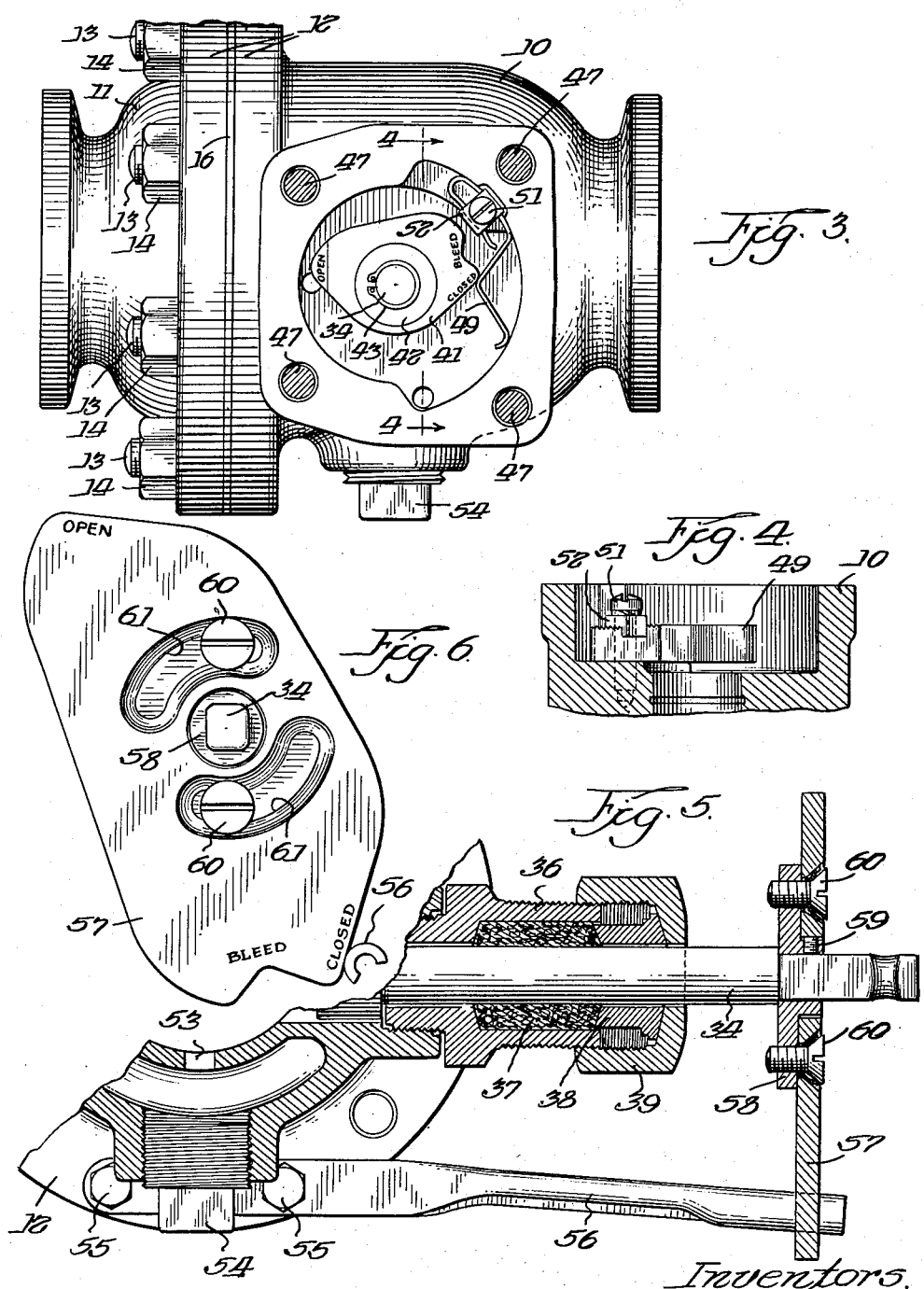

Patented Sept. 22, 1953

2,652,851

UNITED STATES PATENT OFFICE 2,652,851

PILOT VALVE AND INDICATOR
CONSTRUCTION

Edward G. Schmidt, La Grange, and John E.
Svabek, Jr., Chicago, Ill., assignors to Crane
Co., Chicago, Ill., a corporation of Illinois Application August 10, 1950, Serial No. 178,642

5 Claims. (Cl. 137—222)

This invention pertains to a novel valve structure. More especially, it pertains to a pilot valve and indicator construction having a combination bleed and valve arrangement which is particularly adaptable for use in steam lines and the like. The valve proper is of the same general type as that shown in U. S. Patent 1,465,916.

It is an object of this invention to provide a valve having a position indicator and setting mechanism, the combination of which permits a valve setting for either bleeding line fluid or for main valve operation.

Another object is to provide a valve which is easy to operate under relatively high line pressures.

Still another object of this invention is to provide a valve which is constructed to insure a long life and will, therefore, require relatively little maintenance attention.

Other objects and advantages will become more readily apparent upon proceeding with the following description read in light of the accompanying drawings, in which:

Fig. 1 is a sectional view of a preferred embodiment of this invention.

Fig. 2 is a view taken on the line 2—2 of Fig. 1.

Fig. 3 is a plan elevation of the structure shown in Fig. 1.

Fig. 4 is a fragmentary sectional view taken on the line 4—4 of Fig. 3.

Fig. 5 is a fragmentary sectional view showing a modification of this invention.

Fig. 6 is an end view of Fig. 5.

Similar reference numerals refer to similar parts throughout the several views.

As shown in Fig. 1, the invention comprises a valve having a body inlet portion 10 and a body outlet portion 11. The body portions are shown aligned and connected through respective flanges 12 by means of a plurality of body studs 13 and stud nuts 14, and a body gasket 16 is preferably provided to insure fluid tightness therebetween. Opposite ends of the body portions are formed for coupling to the usual line fluid conduits which are not shown.

Preferably cast integral within the body portion 10 is an internal cylinder 17 having a closed upstream portion and an open downstream portion as illustrated. The cylinder 17 is radially spaced within the valve and shaped to effect streamlined fluid flow therearound. The downstream or open end of cylinder 17 receives a valve closure member or plunger 22 which reciprocates therewithin by means hereinafter described, and thereby cooperates with a body seat portion to interrupt fluid flow through the valve.

Mounted within the cylinder 17 is a pinion 18 positioned in operative relation with a rack 19 which is guided by a sleeve member 21. An enlarged end 23 of the rack 19 extends within the plunger 22 to abut a shoulder portion 24. By means of a washer 26, secured within the plunger 22 by a retaining ring 27, the rack end 23 is connected to the plunger with a predetermined amount of lost motion, as more clearly shown in Fig. 1.

The face of rack end 23 is provided with a shank 28 having an opening 29 extending therethrough to loosely receive a pin 31. Disposed within the face of the plunger 22 is a pilot disc 32 which is connected to the pin 31 and thereby actuated by the reciprocation of the rack 19. It should also be noted in connection with Fig. 1 that a coil spring 33 is preferably located between the pilot disc 32 and the rack end 23. Thus, in the closing operation of the valve, the pilot disc 32 is seated by a force transmitted through the spring 33, thereby avoiding a rigid contact with the pilot disc. The outward movement of the rack 19 is limited by the plunger shoulder 24 which protects the pilot disc 32 from the direct force of the rack in the final stage of valve closing.

In connection with Fig. 2, the means of rotating and providing a mounting for the pinion 18, is a stem 34 which is mounted in a bushing 35 within the valve. The stem extends transverse to the valve through a shank 36 where it is surrounded by the usual packing 37, gland 38 and gland nut 39. The stem 34 may be rotated by any conventional means attached to the end thereof, and no positive means is shown herein.

An opposite end of the stem 34 receives, preferably within the valve body, a detent cam 41 which is splined thereto and attached by a washer 42 and retaining ring 43. A cover plate 44 and a gasket 46 seal off the side of the valve body and are held thereto by a plurality of cover plate studs 47 and nuts 48.

The valve, as shown in Fig. 3 without the cover plate 44, exposes the detent cam 41. Since the cam is splined to the stem 34, stem movement, and consequently movement of the rack 19, are indicated on the detent cam. Thus, the cam 41 is preferably shaped, as shown, to cooperate with a predeterminately shaped leaf spring 49 which is mounted on the body portion 10 by means of a screw 51 and a clip 52 as per Fig. 4. With the aforementioned construction, the cam may be set in a desired position relative to the stem and pilot valve position. A further adjustment in the indicator mechanism may be made through the loosening of screw 51 and clip 52 to allow the spring 49 to be positioned relative to the screw 51.

As apparent in Fig. 4, the spring 49 is retained in position by a serrated portion abutting the spring clip 52. Fig. 3 displays the opposite end of the spring supported by the body 10, whereupon the spring end may slide as the spring flexes. It should be noted the spring is shaped to be received within a notch in the detent cam 41 and thereby locks the cam, stem, and rack assembly in the desired position. Line fluid may then be continuously passed through the valve when the setting above referred to is in the "Bleed" position which permits a predetermined opening of the pilot valve 32. Upon further actuation of the stem, the pilot valve is completely opened permitting valve operation hereinafter described. Other positions of valve setting may be indicated on the cam 41, for example, the positions of "Open" and "Closed," as shown.

It should be understood that the cam and spring arrangement described above could be located external to the valve, as shown in Figs. 5 and 6. A cantilever spring 56 is attached to the body flange by screws 55 and extends substantially parallel to the stem 34 which has a detent cam 57 mounted on the end thereof. The spring cooperates with the cam to maintain the valve in a set position. The cam 57 is adjustably mounted on the stem 34 by means of a cam holder 58 secured to the stem by a set screw 59 and a plurality of screws 60 engaging the cam to the holder through cam slots 61 (see Fig. 6). For the purpose of protecting the valve assembly, it is preferable to locate the indicator and positioner mechanism, as shown in the drawings in Figs. 1 to 4, inclusive.

The above described indicator and positioner mechanisms could obviously be employed with any type of rotatable stem on valves, such as gate, globe, or check.

The initial operation of the valve is as follows: line fluid enters the closed valve through the inlet end, and enters the cylinder 17 through the opening 53. Upon actuation of the stem 34, the pilot disc 32 is predeterminately unseated through the movement of the rack 19. The spring 49 is then engaged in the notch in the detent cam 41 to allow the line fluid to bleed through the valve. Further actuation of the stem 34 completely unseats the pilot disc 32, providing an outlet opening in cylinder 17 approximately twice the area of the cylinder inlet as defined by the opening 53 plus whatever clearance may exist between the plunger 22 and cylinder 17. Thus, since the cylinder outlet area is greater than the inlet area, the fluid pressure within the cylinder becomes less than that surrounding the same. It is by virtue of this pressure differential feature that the valve is easy to operate as line fluid then creates a pressure greater on the face of the plunger 22 than inside the cylinder 17, and thus pressure aids in the unseating of the plunger 22. Further operation of the valve is as previously described.

By providing the previously described valve "bleeding" feature, line fluid may, of course, be continually passed through the valve. This feature is found to be particularly useful in connection with the flow of steam which may freeze within the line when used under cold temperature conditions.

As shown in the drawings, a drain plug 54 may be threaded into the bottom of the valve body.

Although this invention has been shown in a specific form for illustrative purposes, it will be apparent that it is susceptible to numerous changes in form, and should, therefore, be limited only by the spirit thereof and the scope of the appended claims.

We claim:

1. A pilot valve and indicator construction comprising in combination a body having fluid inlet and outlet openings therethrough, a cylinder spaced within said body, a plunger disposed within an end of said cylinder to selectively interrupt fluid flow through said valve outlet, a pilot valve mounted in said plunger, actuating means resiliently attached to said pilot valve and connected to said plunger with predetermined lost motion to thereby effect operation of said pilot valve preliminary to said plunger operation, a detent cam mounted within said valve body arranged to cooperate with said actuating means and having valve indicator markings thereon, adjustable resilient means attached to said body to indicate valve position on said detent cam and yieldingly maintain predetermined valve position.

2. A pilot valve and indicator construction comprising in combination a body having fluid inlet and outlet openings therethrough, a cylinder spaced within said body, a plunger disposed within an end of said cylinder to selectively interrupt fluid flow through said valve outlet, a pilot valve mounted in said plunger, actuating means resiliently attached to said pilot valve and connected to said plunger with predetermined lost motion to thereby effect operation of said pilot valve preliminary to said plunger operation, a detent cam mounted within said valve body and arranged to cooperate with said actuating means, adjustable resilient means attached to said body to indicate the valve position on said detent cam and yieldingly maintain predetermined valve position, the said actuating means including a rotatable stem with the said cam being non-rotatably mounted relative to the said stem.

3. A pilot valve and indicator construction comprising in combination a body having fluid inlet and outlet openings therethrough, a cylinder spaced within said body, a plunger disposed within an end of said cylinder to selectively interrupt fluid flow through said valve outlet, a pilot valve mounted in an opening in the plunger, the area of the opening for the said pilot valve being substantially twice as large as any fluid inlet to the cylinder and plunger assembly, actuating means resiliently attached to said pilot valve and connected to said plunger with predetermined lost motion to thereby effect operation of said pilot valve preliminary to said plunger operation, a detent cam mounted within said valve body arranged to cooperate with said actuating means and having valve indicator markings thereon, resilient means attached to said body to indicate valve position on said detent cam and yieldingly maintain predetermined valve position.

4. A pilot valve and indicator construction comprising in combination a body having fluid inlet and outlet openings therethrough, a cylinder spaced within said body, a plunger disposed within an end of said cylinder to selectively interrupt fluid flow through said valve outlet, a pilot valve mounted in said plunger, actuating means resiliently attached to said pilot valve and connected to said plunger with predetermined lost motion to thereby effect operation of said pilot valve preliminary to said plunger operation, a detent cam mounted within said valve body arranged to cooperate with said actuating means and having valve indicator markings thereon, resilient means attached to said body to indicate valve position on said detent cam and yieldingly maintain predetermined valve position, the said resilient means cooperating with the said detent cam in being yieldingly urged against the periphery thereof.

5. A pilot valve and indicator construction comprising in combination a body having fluid inlet and outlet openings therethrough, a cylinder spaced within said body, a plunger disposed within an end of said cylinder to selectively interrupt fluid flow through said valve outlet, a pilot valve mounted in said plunger, actuating means including a coil spring member cooperating with said pilot valve and said plunger with predetermined lost motion therebetween thereby to effect operation of said pilot valve preliminary to said plunger operation, the said coil spring attachment of the actuating means to the pilot valve cooperating with the lost motion plunger connection and permitting full opening and closing of the said pilot valve prior to unseating and seating said plunger respectively, a detent cam mounted within said valve body arranged to cooperate with said actuating means and having valve indicator markings thereon, resilient means attached to said body to indicate valve position on said detent cam and yieldingly maintain predetermined valve position.

EDWARD G. SCHMIDT.
JOHN E. SVABEK, Jr.

References Cited in the file of this patent

UNITED STATES PATENTS

| Number | Name | Date |
|---|---|---|
| 140,006 | Brown | June 17, 1873 |
| 498,496 | Wilkes | May 30, 1893 |
| 588,045 | Anderson | Aug. 10, 1897 |
| 600,360 | Crane | Mar. 8, 1898 |
| 1,137,129 | Gold | Apr. 27, 1915 |
| 1,465,916 | Larner | Aug. 21, 1923 |
| 1,583,427 | Snow | May 4, 1926 |
| 1,779,750 | Oldham | Oct. 28, 1930 |
| 2,274,318 | Campbell | Feb. 24, 1942 |

FOREIGN PATENTS

| Number | Country | Date |
|---|---|---|
| 140,159 | Great Britain | Mar. 25, 1920 |